B. F. ALLEN.
Improvement in Cutting Tools.
No. 123,604.     Patented Feb. 13, 1872.
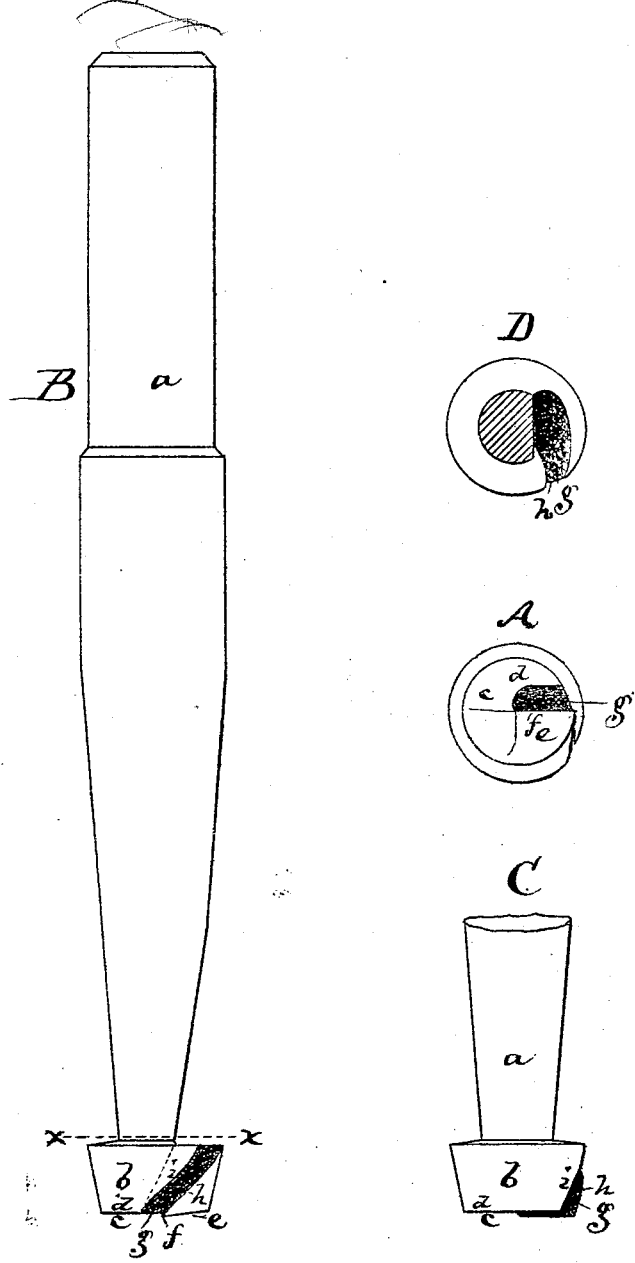

UNITED STATES PATENT OFFICE.

BENJAMIN F. ALLEN, OF BOSTON, MASSACHUSETTS.

IMPROVEMENT IN CUTTING-TOOLS.

Specification forming part of Letters Patent No. 123,604, dated February 13, 1872.

*To all whom it may concern:*

Be it known that I, BENJAMIN F. ALLEN, of Boston, in the county of Suffolk and State of Massachusetts, have invented certain Improved Boring and Cutting Tools; and I do hereby declare that the following, taken in connection with the drawing which accompanies and forms part of this specification, is a description of my invention sufficient to enable those skilled in the art to practice it.

My invention relates to the construction of a rotary tool to be used both for boring and for lateral cutting; its general purpose being for slightly entering the face of a piece of work, and then reducing said work in any direction in which the material is moved for the action of the tool. Thus, in removing material from the surface of an engraved block to leave the figure in relief, and in routing letters, &c., from old type-blocks, the tool comes into play with very desirable and perfect results.

In my invention I construct the tool with a cutting or entering point, the cutting-edge of which stands out beyond the stock, so that said cutting-edge penetrates easily, cutting a shaving gauged by the extent of projection of the cutting-point beyond the surface, the throat enlarging as it extends back from the cutting-point or surface, so as to freely deliver the shavings cut. The vertical cutting-edge, connecting with the end cutting-edge for cutting laterally, sets out eccentrically to the point of the tool at the opposite side of the throat in the same right-angular plane to the axis, thereby cutting a shaving gauged by the distance of the cutting-edge, radially, beyond the said opposite surface in the same plane, and the throat enlarging from the cutting-point inwardly to insure the free delivery of the shaving. It is in such a tool that my invention consists.

The drawing represents a rotary cutting or reducing tool embodying the invention. A shows the tool in end view. B and C are side views of it. D is a section on the line $x\,x$.

$a$ denotes the spindle or stock, which is confined in the poppet or arbor of the lathe or other machine through which rotary motion is imparted to the tool. $b$ denotes the cutter-head. The entering end $c$ of this head is shown as made with a flat and smooth surface, $d$, from which one part, $e$, inclines outward and terminates in the cutting-edge $f$, which edge stands slightly out from the plane of the surface $d$, so that upon presentation of the work to it said edge cuts a shaving as does the bit of a plane, and the wood or other material is reduced as the tool is pressed against it, or as it is pressed against the tool, the shaving entering the throat $g$, which enlarges from the cutting-edge up through the head, and inclines from the direction of rotation, the enlargement and inclination causing the shavings to freely escape through the top of the head. From the entering end the head enlarges, and the throat $g$ opens out to the periphery or side of the head, there being on the side corresponding to the cutting-edge $f$ a peripheral cutting-edge, $h$, which, as before remarked, stands out slightly from the gauge-lip $i$ at the opposite side of the throat in every plane right-angular to the axis of the tool, the throat enlarging inwardly or radially as well as upwardly, and the cutting-edge cutting laterally in every or in any direction as the work is moved against it laterally.

The cut thus produced is a smooth clean cut, both at the face of the work acted upon by the cutting-edge $f$ and at the edges of the work reduced by the cutting-edge, the material being shaved off and not removed by abrasive or grinding action of the tool.

With my improved tool, which may be used to great advantage in cutting engravers' blocks and in reducing other surfaces, the work may be readily held by hand to the tool, or may be slid loosely over a table brought toward the tool by a suitable treadle, the work requiring no clamping or other confinement, and being placed upon a table only as a means to readily gauge and keep uniform the depth of cut, when the material is to be removed, to a uniform depth.

I claim—

The cutting-tool described, formed with the projecting cutting-edges $f$ and $h$, and with a throat enlarging inwardly and upwardly, and operating as set forth.

BENJ. F. ALLEN.

Witnesses:
   FRANCIS GOULD,
   CHARLES A. ALLEN.